United States Patent
Reddy et al.

(10) Patent No.: US 6,753,401 B1
(45) Date of Patent: Jun. 22, 2004

(54) SILCON-CONTAINING POLYMERS

(75) Inventors: Poreddy Narsi Reddy, Bangalore (IN); Teruyuki Hayashi, Matsudo (JP); Masato Tanaka, Tokyo (JP)

(73) Assignee: National Institute of Advanced Industrial Science and Technology (JP)

( * ) Notice: Subject to any disclaimer, the term of this patent is extended or adjusted under 35 U.S.C. 154(b) by 0 days.

(21) Appl. No.: 10/111,193

(22) PCT Filed: Mar. 31, 2000

(86) PCT No.: PCT/JP00/02117

§ 371 (c)(1),
(2), (4) Date: Aug. 6, 2002

(87) PCT Pub. No.: WO01/30787

PCT Pub. Date: May 3, 2001

(30) Foreign Application Priority Data

Oct. 28, 1999 (JP) ............................................ 11-307737
Oct. 28, 1999 (JP) ............................................ 11-307740

(51) Int. Cl.$^7$ ............................ C07F 7/18; C08G 77/52; B01J 31/24
(52) U.S. Cl. ............................ 528/15; 528/29; 528/31; 556/443; 556/470
(58) Field of Search ............................ 528/15, 29, 31; 556/443, 470

(56) References Cited

U.S. PATENT DOCUMENTS 3,346,515 A  10/1967  Currey
4,026,827 A  5/1977  Steffen ........................... 260/2

FOREIGN PATENT DOCUMENTS

| EP | 0 509 271 A2 | 3/1992 |
| EP | 0 546 473 A1 | 12/1992 |
| JP | 58-40127 | 3/1983 |

OTHER PUBLICATIONS

Purkayastha et al., 'Silicon–oxygen bonding on diphenylsilane through palladium(II)–catalysed reactions' Appl. Organometal. Chem., (2000), 14, p. 477–483.*
Organometallics, 1998, vol. 17, No. 12, pp. 2656–2664.
J. Polym. Sci. Part, A–1, 1970, vol. 8, No. 4, pp. 973–978.
Chem. Lett., 2000 No. 3, p. 250–251.
Purkayashtha, A. et al, the 12 International Symposium on Orgnosilicon Chemistry, Sendai, May 24, 1999, Abstr. No. P171.
Chauhan, P.N. et al, the 76th Annual Meeting of the Chemical Society of Japan, Yokohama, Mar. 31, 1999, Abstr. No. 4B501.

* cited by examiner

*Primary Examiner*—Brian Davis
(74) *Attorney, Agent, or Firm*—Lorusso, Loud & Kelly

(57) ABSTRACT

A process for the production of a silicon-containing polymer having a main chain of oxygen atoms, organic groups and Si—H and a process for the production of a silicon-containing polymer having a main chain of oxygen atoms, organic groups and disubstituted silicon atoms are disclosed. The silicon-containing polymer may be produced by dehydrogenative polymerization of quinone and/or diol with trihydrosilane or dihydrosilane in the presence of a palladium-containing catalyst.

4 Claims, No Drawings

SILCON-CONTAINING POLYMERS

TECHNICAL FIELD

This invention is directed to a silicon-containing polymer and to a process for the preparation thereof.

BACKGROUND ART

Various types of silicon-containing polymers are hitherto known. Among them, a silicon-containing polymer having recurring structural units represented by the following formula (a):

(a)

wherein Ar represents an arylene group and $R^1$ and $R^2$ each represent a substituent such as an aryl group, an alkoxy group or an alkyl group, is excellent in resistance to heat and is studied for use as an aerospace material (J. Appl. Polym. Sci., 9, 295(1965); J. Polym. Sci., A, Polym. Chem., 32, 131(1994)).

The silicon-containing polymer having the recurring structural units represented by the above formula (a) is produced by polycondensation of hydroquinone with a di-substituted silane or dehydrogenative polymerization of quinone with di-substituted silane.

It is an object of the present invention to provide a novel silicon-containing polymer having a main chain which comprises organic groups, oxygen atoms and silicon atoms.

Another object of the present invention is to provide an industrially advantageous process for the production of a silicon-containing polymer having a main chain which comprises organic groups, oxygen atoms and silicon atoms.

DISCLOSURE OF THE INVENTION

In accordance with the present invention there is provided a silicon-containing polymer represented by the following general formula (1);

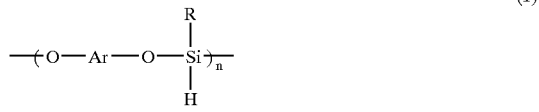

(1)

wherein Ar represents an arylene group which may have a substituent, R represents a hydrocarbyl group which may have a substituent and n is a number average polymerization degree of 2–5,000.

The present invention also provides a process for the production of a silicon-containing polymer represented by the above general formula (1), characterized in that at least one compound selected from quinone and aromatic diols and at least one trihydrosilane represented by the following general formula (3):

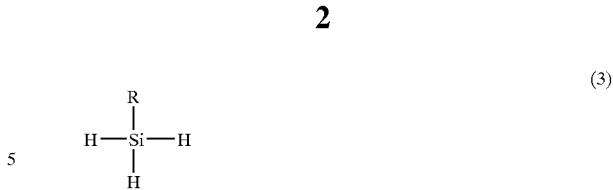

(3)

wherein R represents a hydrocarbyl group which may have a substituent, are subjected to dehydrogenative polymerization in the presence of a palladium-containing catalyst.

The present invention further provides a process for the production of a silicon-containing polymer represented by the following general formula (2):

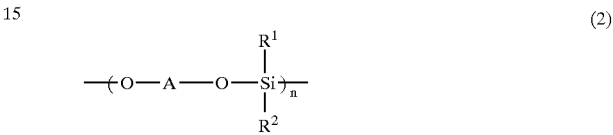

(2)

wherein A represents an aralkylene group which may have a substituent or an alkylene group which may have a substituent, $R^1$ and $R^2$ each represent a hydrocarbyl group which may have a substituent but one of $R^1$ and $R^2$ is an aryl group and n is a number average polymerization degree of 2–5,000, characterized in that at least one diol represented by the following general formula (4):

$$HO—A—OH \qquad (4)$$

wherein A represents an aralkylene group which may have a substituent or an alkylene group which may have a substituent and at least one dihydrosilane represented by the following general formula (5):

(5)

wherein $R^1$ and $R^2$ each represent a hydrocarbyl group which may have a substituent but one of $R^1$ and $R^2$ is an aryl group, are subjected to dehydrogenative polymerization in the presence of a palladium-containing catalyst.

The present invention further provides a process for the production of a silicon-containing polymer represented by the following general formula (6):

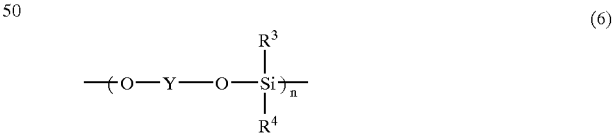

(6)

wherein Y represents a divalent hydrocarbyl group which may have a substituent, $R^3$ and $R^4$ each represent a hydrocarbyl group which may have a substituent and n is a number average polymerization degree of 2–5,000, characterized in that at least one diol represented by the following general formula (7):

$$HO—Y—OH \qquad (7)$$

wherein Y represents a hydrocarbyl group which may have a substituent and at least one dihydrosilane represented by the following general formula (8):

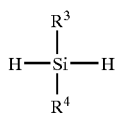

(8)

wherein R³ and R⁴ each represent a hydrocarbyl group which may have a substituent, are subjected to dehydrogenative polymerization in the presence of a palladium-containing catalyst.

BEST MODE FOR CARRYING OUT THE INVENTION

In the above general formula (1), Ar represents an arylene group which may have a substituent. The arylene group has 6–18 carbon atoms, preferably 6–12 carbon atoms. The arylene group may be phenylene or naphthylene. The substituent may be a halogen atom (chlorine, bromine, iodine or fluorine), a cyano group, an alkoxy group, an aryloxy group, etc. Specific examples of the arylene group include various 1,4-phenylenes and 1,4-naphthylenes such as 1,4-phenylene, 1,4-naphthylene, 2-t-butyl-1,4-phenylene, phenyl-1,4-phenylene, 2,5-dimethyl-1,4-phenylene, 2,3,5,6-tetramethyl-1,4-phenylene, 2,5-dichloro-1,4-phenylene, 2,3,5,6-tetrachloro-1,4-phenylene and 2,3-dichloro-5,6-dicyano-1,4-phenylene.

In the above general formula (1), R represents a hydrocarbyl group. The hydrocarbyl group has 1–18 carbon atoms, preferably 1–12 carbon atoms. The hydrocarbyl group may be an alkyl group having 1–18 carbon atoms, preferably 1–12 carbon atoms, a cycloalkyl group having 4–10 carbon atoms, preferably 6–8 carbon atoms, an aryl group having 6–18 carbon atoms, preferably 6–12 carbon atoms or an aralkyl group having 7–17 carbon atoms, preferably 7–11 carbon atoms. The hydrocarbyl group may have a substituent such as a halogen atom, a cyano group, an alkoxy group or an aryloxy group. Examples of the hydrocarbyl group include phenyl, p-tolyl, m-tolyl, p-anisyl, p-chlorophenyl, p-fluorophenyl, p-trifluoromethylphenyl, p-cyanophenyl, methyl, ethyl, isopropyl, sec-butyl, hexyl and benzyl.

In the above general formula (1), n represents a number-average polymerization degree and is 2–5,000, especially 5–1,000.

The silicon-containing polymer of the above general formula (1) may be produced by subjecting at least one compound selected from quinone and aromatic diols and at least one trihydrosilane represented by the above general formula (3) to dehydrogenative polymerization in the presence of a palladium-containing catalyst.

The quinone includes various benzoquinones and naphthoquinones. Examples of quinone include 1,4-quinones such as 1,4-benzoquinone, 1,4-naphthoquinone, 2-t-butyl-1,4-benzoquinone, phenyl-1,4-benzoquinone, 2,5-dimethyl-1,4-benzoquinone, 2,3,5,6-tetramethyl-1,4-benzoquinone, 2,5-dichloro-1,4-benzoquinone, 2,3,5,6-tetrachloro-1,4-benzoquinone and 2,3-dichloro-5,6-dicyano-1,4-benzoquinone.

The aromatic diol is not specifically limited but is preferably hydroquinone or resorcinol. Examples of hydroquinone and resorcinol include hydroquinone, methylhydroquinone, t-butylhydroquinone, chlorohydroquinone, 2-methoxyhydroquinone, phenylhydroquinone, 2,3-dimethylhydroquinone, 2,3,5,6-tetramethylhydroquinone, 2,3,5,6-tetrachlorohydroquinone, resorcinol, 2-methylresorcinol, 4-hexylresorcinol, 5-phenylresorcinol and 1,4-dihydroxynaphthalene.

The above-mentioned trihydrosilane is not specifically limited. Examples of trihydrosilane include phenylsilane, p-tolylsilane, m-tolylsilane, p-anisylsilane, p-chlorophenylsilane, p-fluorophenylsilane, p-trifluoromethylphenylsilane, p-cyanophenylsilane, methylsilane, ethylsilane, isopropylsilane, sec-butylsilane, hexylsilane and benzylsilane.

The palladium-containing catalyst for use in the present invention may be various kinds of conventionally known catalysts. A palladium complex having a tri-substituted phosphine ligand is preferably used. The substituent may be an alkyl group having 1–12 carbon atoms, preferably 1–6 carbon atoms, a cycloalkyl group having 4–10 carbon atoms, preferably 6–8 carbon atoms, an aryl group having 6–12 carbon atoms, preferably 6–10 carbon atoms, an aralkyl group having 7–11 carbon atoms, preferably 7–9 carbon atoms. Examples of the palladium-containing catalyst include bis(triphenylphosphine)dichloropalladium, bis(triethylphosphine)dichloropalladium, bis(tricyclohexylphosphine)palladium, tetrakis(triphenylphosphine)palladium, tris(triethylphosphine)palladium, (tetramethylethylenediamine)dichloropalladium, allylpalladiumchloride dimer, bis(benzonitrile)dichloropalladium, (1,5-cyclooctadiene)dichloropalladium, tris(dibenzylideneacetone)dipalladium, bis(acetylacetonate)palladium, palladium acetate, palladium chloride and palladium black.

The molar ratio of the quinone and/or aromatic diol to the trihydrosilane is not specifically limited. From the standpoint of the molecular weight of the polymer, however, the molar ratio of the quinone and/or aromatic diol to the trihydrosilane is preferably in the range of 1:5 to 5:1, more preferably in the range of 1:2 to 2:1. The molar ratio of the trihydrosilane to the palladium of the palladium-containing catalyst is not limited, either. For reasons of yield, however, the molar ratio of the trihydrosilane to the palladium of the palladium-containing catalyst is preferably in the range of 10,000:1 to 2:1, more preferably in the range of 2,000:1 to 5:1.

The reaction in the present invention may be carried out without using a solvent when one of the raw materials is a liquid. Generally, however, a solvent such as a hydrocarbon solvent (e.g. benzene, toluene or hexane), an ether solvent (e.g. diethyl ether, tetrahydrofuran (THF) or dioxane), a halogen-containing solvent (e.g. methylene chloride or chloroform) may be used. The reaction temperature is not specifically limited, either. For reasons of reactivity and stability of the raw materials, the reaction temperature is in the range of 0–150° C., preferably 20–120° C.

The silicon-containing polymer thus obtained is a polymer in which structural units of the following general formula (9):

 (9)

are alternately linked to structural units of the following general formula (10):

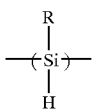

(10)

The plurality of Ar contained in the polymer may be the same or different. The plurality of R contained in the polymer may be also the same or different.

In the above general formula (2), A represents an aralkylene group, an alkylene group or a cycloalkylene group. The aralkylene group may include a phenylene alkylene group, a phenylene dialkylene group, a naphthylene alkylene group or a naphthylene dialkylene group and has 6–18 carbon atoms, preferably 6–12 carbon atoms. The alkylene group may be alkylene having 1–18 carbon atoms, preferably 2–12 carbon atoms. The cycloalkylene group may be cycloalkylene having 4–10 carbon atoms, preferably 6–8 carbon atoms. The substituent may be a halogen atom (chlorine, bromine, iodine or fluorine), a cyano group, an alkoxy group, an aryloxy group, etc. Specific examples of the divalent group A include ethylene, 1,3-propylene, 1,4-butylene, 1,3-butylene, 1,4-cyclohexylene, phenyl-1,2-ethylene, dimethyl-2,3-butylene, α,α'-p-xylylene, α,α'-m-xylylene and naphthylene-1,3-dimethylene.

In the above general formula (2), $R^1$ and $R^2$ each represent a hydrocarbyl group but one of $R^1$ and $R^2$ is an aryl group. The hydrocarbyl group may include an alkyl group having 1–18 carbon atoms, preferably 1–12 carbon atoms, a cycloalkyl group having 4–10 carbon atoms, preferably 6–8 carbon atoms, an aryl group having 6–18 carbon atoms, preferably 6–12 carbon atoms or an aralkyl group having 7–17 carbon atoms, preferably 7–11 carbon atoms. The hydrocarbyl group may have a substituent such as a halogen atom, a cyano group, an alkoxy group or aryloxy group. Examples of the hydrocarbyl group include methyl, ethyl, propyl, butyl, hexyl, dodecyl, cyclohexyl, phenyl, naphthyl, benzyl, tolyl, anisyl or trifluoromethylphenyl.

In the above general formula (2), n represents a number average polymerization degree and is 2–5,000, especially 5–1,000.

Specific examples of the silicon-containing polymer represented by the general formula (2) include: poly[α,α'-p-xylylenedioxy(phenylmethylsilylene], poly[α,α'-p-xylylenedioxy(diphenylsilylene], poly[α,α'-m-xylylenedioxy(diphenylsilylene], poly[1,2-ethylenedioxy (naphthylmethylsilylene], poly[1,4-butylenedioxy (phenylmethylsilylene] and poly[1-phenyl-1,2-ethylenedioxy(diphenylsilylene].

The silicon-containing polymer represented by the above general formula (2) may be produced by subjecting at least one diol represented by the above general formula (4) and at least one dihydrosilane represented by the above general formula (5) to dehydrogenative polymerization in the presence of a palladium-containing catalyst.

Examples of the diol include ethylene glycol, 1,3-propanediol, 1,4-butanediol, 1,3-butanediol, 1,4-cyclohexanediol, phenyl-1,2-ethanediol, dimethyl-2,3-butanediol, α,α'-p-xylylenediol and α,α'-m-xylylenediol.

Examples of the dihydrosilane include phenylmethylsilane, naphthylmethylsilane, phenylbenzylsilane, tolylmethylsilane, anisylmethylsilane, trifluoromethylphenylmethylsilane, diphenylsilane, ditolylsilane, dianisylsilane, bis(trifluoromethylphenyl) silane, dinaphthylsilane and phenylethylsilane.

As the palladium-containing catalyst, there may be used various palladium-containing catalysts described above with reference to the silicon-containing polymer of the general formula (1).

The molar ratio of the diol to the dihydrosilane is not specifically limited but is preferably in the range of 1:5 to 5:1, more preferably in the range of 1:2 to 2:1. The molar ratio of the dihydrosilane to the palladium of the palladium-containing catalyst is not limited, either. For reasons of yield, however, the molar ratio of the dihydrosilane to the palladium of the palladium-containing catalyst is preferably in the range of 10,000:1 to 2:1, more preferably in the range of 2,000:1 to 5:1.

The reaction in the present invention may be carried out without using a solvent when one of the raw materials is a liquid. Generally, however, a solvent such as a hydrocarbon solvent (e.g. benzene, toluene or hexane), an ether solvent (e.g. diethyl ether, THF or dioxane), a halogen-containing solvent (e.g. methylene chloride or chloroform) may be used. The reaction temperature is not specifically limited, either. For reasons of reactivity and stability of the raw materials, the reaction temperature is in the range of 0–150° C., preferably 20–120° C.

The present invention comprises a process of producing a silicon-containing polymer represented by the above general formula (6). This process uses at least one diol represented by the above general formula (7) as the starting material diol.

In the general formula (7), Y represents a divalent hydrocarbyl group. The hydrocarbyl group has 1–18 carbon atoms, preferably 1–12 carbon atoms. The hydrocarbyl group may be an alkylene group having 1–18 carbon atoms, preferably 1–12 carbon atoms, a cycloalkylene group having 4–10 carbon atoms, preferably 6–8 carbon atoms, an arylene group having 6–18 carbon atoms, preferably 6–12 carbon atoms or an aralkylene group having 7–17 carbon atoms, preferably 7–11 carbon atoms. The hydrocarbyl group may have a substituent such as a halogen atom, a cyano group, an alkoxy group or aryloxy group. Examples of the hydrocarbyl group include ethylene, 1,3-propylene, 1,4-butylene, 1,3-butylene, 1,4-cyclohexylene, phenyl-1,2-ethylene, dimethyl-2,3-butylene, α,α'-p-xylylene, α,α'-m-xylylene, 1,4-phenylene, methyl-1,4-phenylene, t-butyl-1,4-phenylene, chloro-1,4-phenylene, 2-methoxy-1,4-phenylene, phenyl-1,4-phenylene, 2,3-dimethyl-1,4-phenylene, 2,3,5,6-tetramethylene-1,4-phenylene, 2,3,5,6-tetrachloro-1,4-phenylene, 1,3-phenylene, 2-methyl-,1,3-phenylene, 4-hexyl-1,3-phenylene, 5-phenyl-1,3-phenylene and 1,4-naphthylene.

The silicon-containing polymer of the above general formula (6) may be produced by subjecting at least one compound selected from those diols represented by the above general formula (7) and at least one compound selected from those dihydrosilane represented by the above general formula (8) to dehydrogenative polymerization in the presence of a palladium-containing catalyst.

Examples of the diol represented by the above general formula (7) include ethylene glycol, 1,3-propanediol, 1,4-butanediol, 1,3-butanediol, 1,4-cyclohexanediol, phenyl-1, 2-ethanediol, dimethyl-2,3-butanediol, α,α'-p-xylylenediol, α,α'-m-xylylenediol, hydroquinone, methylhydroquinone, t-butylhydroquinone, chlorohydroquinone, 2-methoxyhydroquinone, phenylhydroquinone, 2,3-dimethylhydroquinone, 2,3,5,6-tetramethylhydroquinone, 2,3,5,6-tetrachlorohydroquinone, resorcinol, 2-methylresorcinol, 5-phenylresorcinol and 1,4-dihydroxynaphthalene.

Examples of the dihydrosilane represented by the above general formula (8) include those described with reference to the dihydrosilane of the above general formula (5) and, additionally, dimethylsilane, propylmethylsilane, butylmethylsilane, hexylmethylsilane, dodecylmethylsilane, dibutylsilane, dihexylsilane, dicyclohexylsilane, dibenzylsilane and dibenzylethylsilane.

The production of the silicon-containing polymer of the above general formula (6) may be carried out in the same manner as that of the silicon-containing polymer of the above general formula (2).

EXAMPLE

The present invention will be further described in detail below by examples.

Example 1

To a benzene (0.5 mL) solution containing p-benzoquinone (0.6 mmol) and bis(triethylphosphine) dichloropalladium (0.02 mol), phenylsilane (0.5 mmol) was added and the mixture was stirred at 80° C. for 7 hours. The reaction mixture was poured into 2 mL of toluene, filtered and fractionated by chromatography to obtain a solution. This was then concentrated to obtain poly[phenylene-1,4-dioxy(phenyl-silylene)] with a yield of 68%. Poly[phenylene-1,4-dioxy(phenylsilylene)]:

Brown oily substance;

Mw/Mn=11,800/5,200 (n=24);

NMR($C_6D_6$): δ 29Si=−35.41 ppm, δ 1H=5.49 ppm;

Elementary analysis: C 66.32, H 4.83 (calculated value C 67.04, H4.70).

Example 2

Example 1 was repeated in the same manner as described except that 1,4-naphthoquinone was substituted for p-benzoquinone to obtain poly[naphthylene-1,4-dioxy(phenylsilylene)] with a yield of 72%. Poly(naphthylene-1,4-dioxy(phenylsilylene)]:

Brown oily substance;

Mw/Mn=5,400/1,800 (n=7);

NMR($C_6D_6$): δ 29Si=−33.98 ppm, δ 1H=5.76 ppm;

Elementary analysis: C 72.52, H 4.57 (calculated value C 72.70, H4.57).

Example 3

To a benzene (0.5 mL) solution containing hydroquinone (0.6 mmol) and bis(triethylphosphine)-dichloropalladium (0.02 mol), phenylmethylsilane (0.5 mmol) was added and the mixture was stirred at 80° C. for 24 hours. The reaction mixture was poured into 2 mL of toluene, filtered and fractionated by chromatography to obtain a solution. This was then concentrated to obtain poly[phenylene-1,4-dioxy(phenylmethylsilylene)] in the form of a colorless oil with a yield of 74%. Mw/Mn=7,000/2,900 (n=13).

Example 4

Example 3 was repeated in the same manner as described except that α,α'-p-xylylenediol was substituted for hydroquinone to obtain poly[α,α'-p-xylylenedioxy-(phenylmethylsilylene)] with a yield of 81%. poly[α,α'-p-xylylenedioxy(phenylmethylsilylene)]:

Colorless oily substance;

Mw/Mn=8,100/3,300 (n=14);

NMR($C_6D_6$): δ 29Si=−15.72 ppm;

Elementary analysis: C 69.46, H 6.41.

Example 5

Example 3 was repeated in the same manner as described except that 1,4-butanediol was substituted for hydroquinone to obtain poly[1,4-butylenedioxy-(phenylmethylsilylene)] with a yield of 66%. poly[1,4-butylenedioxy(phenylmethylsilylene)]:

Colorless oily substance;

Mw/Mn=3,600/1,800 (n=9);

NMR($C_6D_6$): δ 29Si=−17.93 ppm;

Elementary analysis: C 61.97, H 7.21.

The silicon-containing polymer according to the present invention, which has a main chain comprised of oxygen atoms, organic groups and SiH, is useful as a raw material for various materials such as heat resistant materials, luminescent or photoelectric transfer materials or silicon-based ceramics. The silicon-containing polymer, which has highly reactive Si—H bonds, can give silicon-containing polymers having various structures when the Si—H bonds are subjected to various kinds of reactions such as hydrosilylation, dehydrogenation and substitution.

The process according to the present invention for the production of the silicon-containing polymer which has a main chain comprised of oxygen atoms, organic groups and disubstituted silicon atoms may be easily practiced. The silicon-containing polymer, which does not have Si—H bonds, is chemically stable and may be advantageously used as heat resistant materials, luminescent or photoelectric transfer materials or silicon-based ceramics.

What is claimed is:

1. A silicon-containing polymer represented by the following general formula:

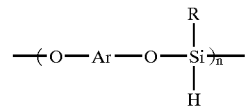

wherein Ar represents an arylene group which may have a substituent, R represents a hydrocarbyl group which may have a substituent and n is a number average polymerization degree of 2–5,000.

2. A process for the production of a silicon-containing polymer represented by the general formula:

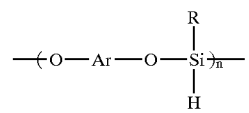

comprising:

subjecting at least one compound selected from quinone and aromatic diols and at least one trihydrosilane represented by the following general formula:

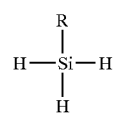

wherein R represents a substituted or unsubstituted hydrocarbyl group, to dehydrogenative polymerization in the presence of a palladium-containing catalyst.

3. A process for the production of a silicon-containing polymer represented by the following general formula:

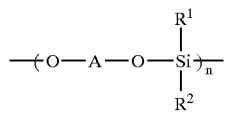

wherein A represents a substituted or unsubstituted alkylene group, $R^1$ and $R^2$ each represent a hydrocarbyl group which may have a substituent but one of $R^1$ and $R^2$ is an aryl group and n is a number average polymerization degree of 2–5,000, comprising:

subjecting at least one diol represented by the following general formula:

wherein A represents a substituted or unsubstituted alkylene group and at least one dihydrosilane represented by the following general formula:

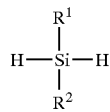

wherein $R^1$ and $R^2$ each represent a hydrocarbyl group which may have a substituent but one of $R^1$ and $R^2$ is an aryl group, to hydrogenative polymerization in the presence of a palladium-containing catalyst.

4. A process for the production of a silicon-containing polymer represented by the following general formula:

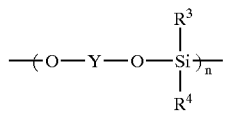

wherein Y represents a substituted or unsubstituted divalent hydrocarbyl group, $R^3$ and $R^4$ each represent a hydrocarbyl group which may have a substituent and n is a number average polymerization degree of 2–5,000, comprising:

subjecting at least one diol represented by the following general formula:

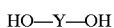

wherein Y represents a hydrocarbyl group which may have a substituent and at least one dihydrosilane represented by the following general formula:

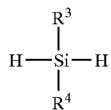

wherein $R^3$ and $R^4$ each represent a substituted or unsubstituted hydrocarbyl group, to dehydrogenative polymerization in the presence of a palladium-containing catalyst.

* * * * *